(12) United States Patent
Kirner

(10) Patent No.: US 6,393,824 B1
(45) Date of Patent: May 28, 2002

(54) GAS POWERED THERMAL GENERATOR

(75) Inventor: Matthias Kirner, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,548

(22) PCT Filed: Sep. 14, 2000

(86) PCT No.: PCT/DE00/03204
§ 371 (c)(1),
(2), (4) Date: Jun. 6, 2001

(87) PCT Pub. No.: WO01/25696
PCT Pub. Date: Apr. 12, 2001

(30) Foreign Application Priority Data

Oct. 6, 1999 (DE) .......................... 199 48 027

(51) Int. Cl.⁷ ................................. F02C 7/26
(52) U.S. Cl. ......................... 60/39.06; 60/517
(58) Field of Search ................. 60/39.06, 517

(56) References Cited

U.S. PATENT DOCUMENTS

| 3,759,244 | A |   | 9/1973 | Konet |         |
|-----------|---|---|--------|-------|---------|
| 3,895,492 | A | * | 7/1975 | Forster et al. | 60/659 |
| 4,367,625 | A | * | 1/1983 | Vitale | 60/517 |
| 4,843,273 | A |   | 6/1989 | Danners et al. | |
| 4,873,826 | A |   | 10/1989 | Dhar | |
| 4,953,354 | A | * | 9/1990 | Erber et al. | 60/517 |

FOREIGN PATENT DOCUMENTS

| DE | 43 08 888 | 9/1994 |
| EP | 0 445 510 | 9/1991 |
| WO | WO 94 05 466 | 3/1994 |

* cited by examiner

Primary Examiner—Hoang Nguyen
(74) Attorney, Agent, or Firm—Kenyon & Kenyon

(57) ABSTRACT

A gas-operated generator heater having a thermoelectric energy converter in a heater housing, in which combustion air can be introduced from the surroundings and a gas-air mixture can be supplied to a burner via a blower having a downstream mixing device, with the blower taking in combustion air out of the heater housing and the gas being capable of being supplied to the mixing device, while the heat produced by the burner can be conducted to the thermoelectric energy converter for conversion into electrical energy and the part of the thermoelectric energy converter to be cooled is also cooled. Expensive water cooling of the thermoelectric energy converter, which is susceptible to breakdown, can thereby be dispensed with in that the part of the thermoelectric energy converter to be cooled is surrounded by a pot-shaped cooling tank to which the combustion air can be supplied in the bottom area from the surroundings and the combustion air heated by this part flows into the heater housing via the open top of the cooling tank.

6 Claims, 2 Drawing Sheets

GAS POWERED THERMAL GENERATOR

FIELD OF THE INVENTION

The present invention relates to a gas-operated generator heater, having a thermoelectric energy converter in a heater housing, in which combustion air can be introduced from the surroundings and a gas-air mixture can be supplied to a burner via a blower with a downstream mixing device, with the blower taking in combustion air out of the heater housing and the gas being capable of being supplied to the mixing device, while the heat produced by the burner can be conducted to the thermoelectric energy converter for conversion into electrical energy and the part of the thermoelectric energy converter to be cooled is also cooled.

BACKGROUND INFORMATION

In known generator heaters of this type, the thermoelectric energy converter generates current. The energy conversion is subject to losses. The waste heat arising must be dissipated outside the thermoelectric energy converter in order to protect it from overheating. Resonant machines which are coupled with linear generators are preferred thermoelectric energy converters. These linear generators are surrounded by a cooling coil in which water circulates and are thereby cooled.

These types of water-cooled devices are not only costly to manufacture, they also restrict the system design. Also, significant costs and technical risks are associated with water cooling, of which those associated with the seals shall be mentioned. In addition, access to the converter for maintenance or repair is difficult.

SUMMARY OF THE INVENTION

It is an object of the present invention to simplify the design of a gas-operated generator heater in such a way that the design does not require water cooling of the converter and thus eliminates the associated costs and risks.

This object is achieved according to the present invention in that the part of the thermoelectric energy converter to be cooled is surrounded by a pot-shaped cooling tank, to which the combustion air can be supplied from the surroundings in the bottom area, and the combustion air warmed by this part flows via the open top of the cooling tank into the heater housing.

With this design of the heater, the combustion air supplied to the heater housing from the surroundings is ingeniously used for cooling of the thermoelectric energy converter before flowing into the heater housing and being taken in through the blower. Because the blower takes in the combustion air from the heater housing, a partial vacuum arises in the housing which is sufficient for the surrounding air to flow into the heater housing via the cooling tank. The surrounding air taken in enters the cooling tank in the bottom area at ambient temperature, flows around the part of the thermoelectric energy converter to be cooled and, having been heated, exits via the open top of the cooling tank into the heater housing. Due to the largely convective heat conduction, a free flow occurs which reinforces the forced flow. The blower therefore supplies the burner with heated combustion air. The waste heat of the converter is thus utilized and remains in the system. The blower generates a pressure in the heater housing which is lower than the pressure of the surrounding air. The pressure in the cooling tank is lower than the pressure of the surrounding air, but is higher than the pressure in the heater housing, so that an air flow arises from the surroundings into the cooling tank and from there into the heater housing.

The cooling tank only has the function of guiding the flow and can therefore be economically manufactured with thin walls, coarse tolerances, and inexpensive material. The requirements for pressure sealing of the cooling tank are low because the pressure differences between the inside and the outside of the tank are also low. Cable bushings and similar parts are not required in the cooling tank, and the exit of the heated combustion air into the heater housing is completely non-critical.

The surrounding air taken in is supplied to the cooling tank in its bottom area. The combustion air can be supplied axially in the bottom area of the cooling tank or the combustion air can be supplied tangentially over the bottom of the cooling tank, in order to uniformly distribute the surrounding air taken into the cooling tank.

According to one embodiment, the gas-operated generator heater is designed in such a way that the combustion gas of the burner transfers the heat to a Stirling engine of the thermoelectric energy converter and the part to be cooled in the cooling tank is implemented as a linear generator.

Furthermore, for the provision of heated service water, a heat exchanger via which heated service water can be removed is connected between the burner and the waste gas outlet.

A portion of the waste heat in the waste gas can be kept in the system by leading the supply of combustion air through at least a part of the waste gas outlet area before it discharges into the cooling tank.

DETAILED DESCRIPTION

Figure 1:
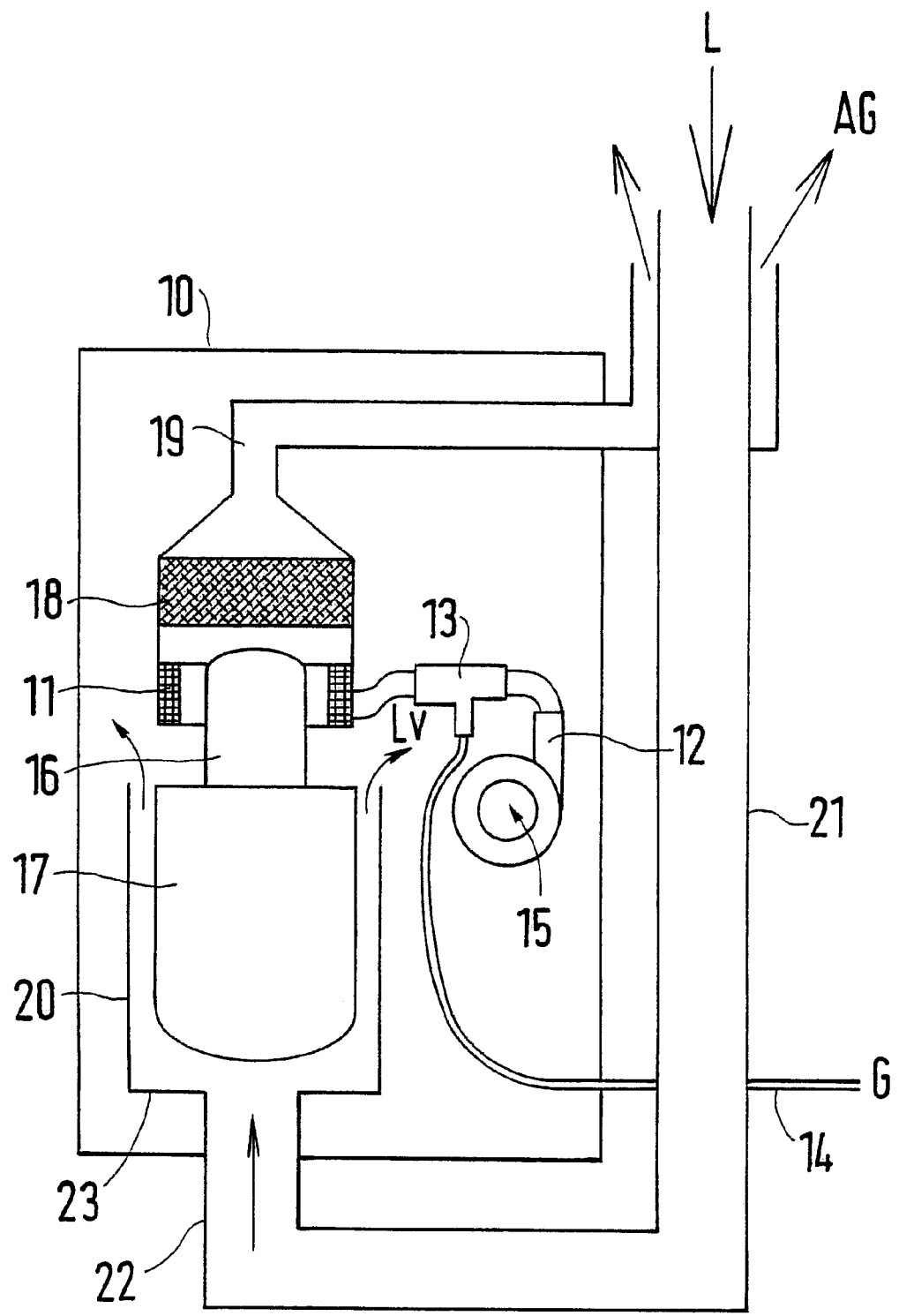
FIG. 1 shows a gas-operated generator heater with axial supply of the combustion air taken into the cooling tank.

A thermoelectric energy converter including a Stirling engine 16 and a linear generator 17 is located in a heater housing 10. The Stirling engine 16 is surrounded by a ring-shaped burner 11 which heats and drives it. This burner 11 is supplied with a gas-air mixture which a blower 12 delivers via a mixing device 13. Blower 12 takes in combustion air 15 required for the gas-air mixture out of heater housing 10 while gas G is supplied 14 to mixing device 13.

A heat exchanger 18, which is heated by the combustion gas and can be used for heating service water, is located over burner 11. Waste gas AG leaves heater housing 10 via a waste gas outlet 19 and therefrom to a waste gas system.

Surrounding air is taken in as combustion air L out of the surroundings of the generator heater, with supply 21 leading through at least a part of waste gas outlet 19 in order to use a part of the heat contained in waste gas AG for preheating combustion air L taken in. The intake process is triggered by the generation of a partial vacuum in heater housing 10 by blower 12.

Combustion air L taken in is not introduced directly into heater housing 10, but rather via a pot-shaped cooling tank 20, which is open on top and encloses and accommodates the linear generator 17 as the part to be cooled.

The supply of combustion air L taken in occurs axially in the center of bottom 23 of cooling tank 20, as shown in FIG.

Figure 2:
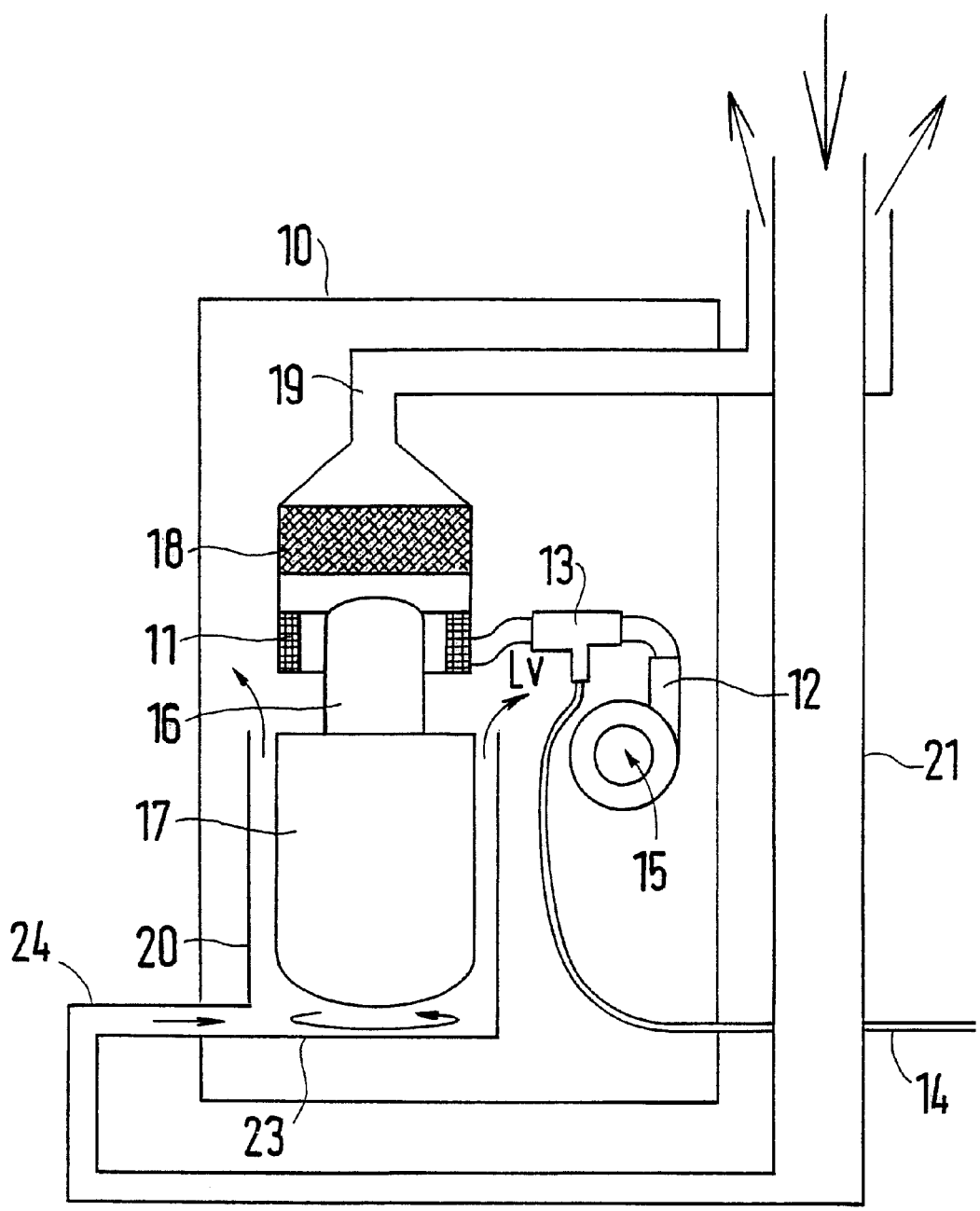
FIG. 2 shows a gas-operated generator heater with tangential supply of the combustion air taken into the cooling tank.

1, or tangentially via bottom 23, as can be seen from the exemplary embodiment according to FIG. 2. In each case, combustion air L taken in passes over the surface of linear generator 17 and cools it. Combustion air L taken in from the surroundings is conducted via the open top of cooling tank 20 into heater housing 10 as heated combustion air L. Due to the pressure conditions in the surroundings and in heater housing 10, an airflow into cooling tank 20 hereby arises.

As can be inferred from both exemplary embodiments, only simple cooling tank 20, which can be manufactured from inexpensive materials and which does not have high requirements for tolerance and air-tightness, is necessary for the cooling of linear generator 17.

It remains to be mentioned that the present invention is not restricted to the exemplary embodiments shown having the thermoelectric energy converter described. The air cooling having a cooling tank according to the present invention can also be used for thermoelectric energy converters designed in other ways.

What is claimed is:

1. A gas-operated heater comprising:
   a heater housing into which combustion air is introduced from the surroundings;
   a burner;
   a blower having a downstream mixing device, the blower supplying a gas-air mixture to the burner, the blower taking in combustion air from the heater housing and gas supplied to the mixing device;
   a thermoelectric energy converter situated in the heater housing, the energy converter converting heat generated by the burner into electrical energy, a first part of the energy converter being cooled; and
   a pot-shaped cooling tank having a bottom area for receiving combustion air from the surroundings, the cooling tank surrounding the first part of the energy converter, the cooling tank heaving an open top, combustion air heated by the first part of the energy converter flowing into the heater housing via the open top of the cooling tank.

2. The heater according to claim 1, wherein the combustion air is supplied axially in the bottom area of the cooling tank.

3. The heater according to claim 1, wherein the combustion air is supplied tangentially over the bottom area of the cooling tank.

4. The heater according to claim 1, wherein combustion gas of the burner transfers heat to a Stirling engine of the energy converter, and the first part of the cooling tank includes a linear generator.

5. The heater according to claim 1, further comprising a heat exchanger, for removing heater service water, connected between the burner and a waste gas outlet.

6. The heater according to claim 1, wherein a supply of the combustion air leads through at least a part of a waste gas outlet area and then discharges into the cooling tank.

* * * * *

UNITED STATES PATENT AND TRADEMARK OFFICE
CERTIFICATE OF CORRECTION

PATENT NO. : 6,393,824 B1
DATED : May 28, 2002
INVENTOR(S) : Matthais Kirner

It is certified that error appears in the above-identified patent and that said Letters Patent is hereby corrected as shown below:

Column 4,
Line 8, change "heaving" to -- having --.

Signed and Sealed this

Twelfth Day of August, 2003

JAMES E. ROGAN
*Director of the United States Patent and Trademark Office*